United States Patent [19]

d'Hautecourt et al.

[11] 4,296,435

[45] Oct. 20, 1981

[54] LUMINANCE SIGNAL PROCESSING CIRCUIT

[75] Inventors: Alain H. d'Hautecourt, Prospect Heights; Wayne E. Bretl, Schaumburg; Ronald B. Lee, Skokie, all of Ill.

[73] Assignee: Zenith Radio Corporation, Glenview, Ill.

[21] Appl. No.: 179,142

[22] Filed: Aug. 18, 1980

[51] Int. Cl.³ .............................................. H04N 5/14
[52] U.S. Cl. .................................... 358/166; 358/170
[58] Field of Search .................... 358/37, 39, 162, 166, 358/170

*Primary Examiner*—John C. Martin
*Attorney, Agent, or Firm*—Jack Kail

[57] ABSTRACT

A luminance signal processing circuit for a television receiver comprises means for separating a full bandwidth luminance signal into a low pass component and first and second derivative components of the low pass component. A differential amplifier is responsive to the component voltage signals for developing first and second current mode signals representing in phase and 180° out of phase combinations of the low pass and second derivative components. The levels of the second derivative components of the first and second current mode signals are selectively adjusted by a peaking signal processor for developing related third and fourth current mode signals whose amplitudes are also selectively adjusted by a picture signal processor for developing an output luminance voltage having selectively controlled contrast and peaking components. A peak white limiter is responsive to white going portions of the second derivative components of the third and fourth current mode signals for automatically causing a corresponding reduction in the level of the output luminance voltage. Finally, a single supply of DC potential is coupled to the picture signal processor for supplying the bias energy from which the first, second, third and fourth current mode signals are derived.

15 Claims, 11 Drawing Figures

LUMINANCE SIGNAL PROCESSING CIRCUIT

BACKGROUND OF THE INVENTION

The present invention relates generally to television receivers and, more particularly, to an improved circuit for processing the luminance signal developed at the output of the video detector of a television receiver.

The output of the video detector of a color television receiver develops a luminance signal which, after suitable processing, is used to modulate the cathode ray tube of the receiver according to the brightness of the reproduced scene. Thus, the luminance signal used in color television transmissions is quite similar to the video signal employed for standard monochrome transmissions. Traditionally, the main function of the television receiver circuitry used to process the luminance signal, commonly referred to as the luminance channel, between the video detector and the cathode ray tube has been that of signal amplification. In this regard, luminance channel designs composed of one, two or three stages of amplification have been used for controllably providing the desired brightness signal to achieve a desired level of signal contrast. A secondary function of the luminance channel has been to introduce a specific time delay in the luminance signal to compensate for the time delay which the chrominance signal experiences due to the narrower bandwidth of the chrominance channel.

More recently, attempts have been made to incorporate a signal peaking function in the luminance channel. As used herein, the term "signal peaking" refers to the technique of accentuating transistions in the luminance signal relative to flat field portions thereof to increase the sharpness of the reproduced image. Typically, derivatives of the full bandwidth luminance signals have been used to derive the necessary peaking signals. In order to accomplish the various functions of the luminance channel prior art luminance signal processing circuits typically consist of a series of cascaded stages each operating from its own source of DC potential to perform its respective function. Such an arrangement results in excessive power consumption and an inefficiently operating circuit. In addition to this problem, prior art luminance channel peaking circuits frequently accentuate signal transitions representing noise in the flat field portions of the luminance signal thereby degrading the clarity of the reproduced image. Yet further, prior art luminance channel peaking circuits often provide excessive white going peaking signals which cause an undesirable blooming in the reproduced picture.

It is, accordingly, a general object of the present invention to provide an improved circuit for processing the luminance signal in a monochrome or color television receiver.

It is a more specific object of the invention to provide a luminance signal processing circuit which is characterized by reduced power consumption and which includes a dynamic noise processed peaking system which accentuates luminance transitions but not noise signal spikes occurring during flat field portions of the luminance signal.

A further object of the invention is to provide such a system wherein blooming due to excessive white going peaking signals is reduced and wherein the peaking or sharpness level as well as the brightness or contrast of the reproduced image are independently controllable by the viewer.

DESCRIPTION OF THE PREFERRED EMBODIMENT

Figure 1:
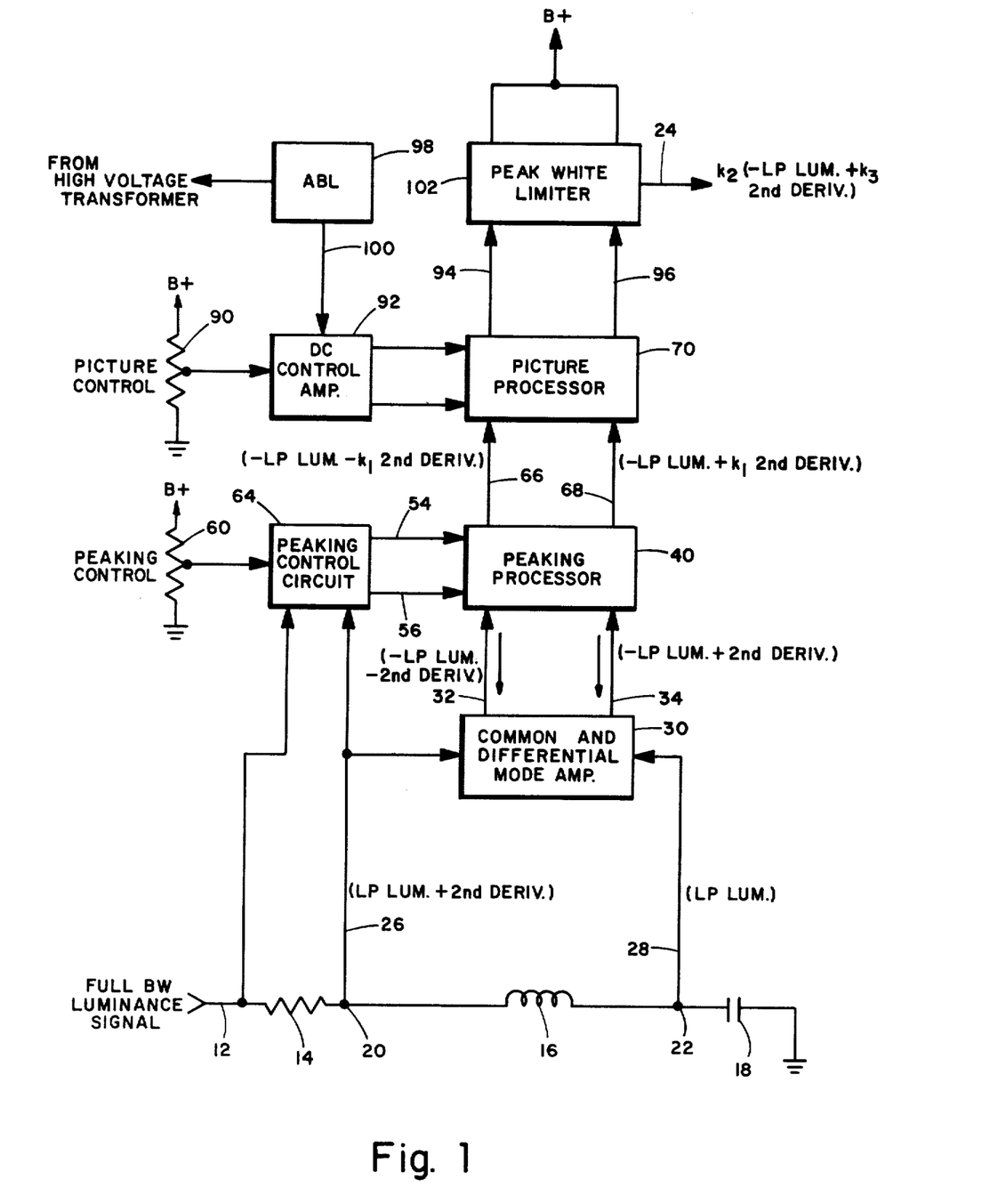
FIG. 1 is a block diagram generally illustrating the luminance signal processing circuit of the invention.

Referring to the drawings, the luminance signal processing circuit of the invention, which is shown in block diagram form in FIG. 1, includes an input conductor 12 which is connected for receiving the full bandwidth luminance signal from the video detector of a conventional television receiver. When the circuit of the invention is used in a color television receiver, a 3.58 MHz trap of comb filter may be connected between the video detector and the conductor 12. The full bandwidth luminance signal is coupled from conductor 12 to a series RLC circuit consisting of a resistor 14, an inductance 16 and a capacitor 18, one plate of the capacitor 18 being connected to a point of ground potential. The series RLC circuit functions to separate the full bandwidth luminance signal developed on the conductor 12 onto various component parts. In particular, the voltage with respect to ground developed at the node 20 formed between the resistor 14 and the inductance 16 comprises a signal including a low pass luminance component and a second derivative component (i.e. the second derivative of the low pass luminance signal). The node 22 formed between the inductance 16 and the capacitor 18 is characterized by a signal voltage with respect to ground having a low pass luminance component only. Therefore, the differential voltage developed across the inductance 16 represents the second derivative of the low pass luminance signal while the differential voltage developed across the resistor 14 represents the first derivative of the low pass luminance signal. In other words, the difference between the full bandwidth luminance signal, which includes a low pass luminance component, a first derivative component and a second derivative component, and the signal voltage developed at the node 20 represents the first derivate of the low pass luminance signal. The foregoing signals are illustrated in FIGS. 2A–2E in relation to a full bandwidth luminance signal representing a single vertical bar.

The remainder of the luminance signal processing circuit of FIG. 1 is operative in response to the signal component voltages developed by the series RLC circuit for developing an output luminance signal on a conductor 24 which comprises a selectively adjustable low pass luminance component and a peak white limited second derivate peaking component, these two components being 180° out of phase with each other. More specifically, the signal voltages developed at nodes 20 and 22 of the series RLC circuit are coupled by a pair of conductors 26 and 28 respectively to a conventional common and differential mode amplifier 30. The amplifier 30, in a manner well known in the art, develops a pair of current mode signals on output conductors 32 and 34, whose polarities are represented by the adjacent arrows. Since the common mode signal supplied to the amplifier 30 comprises the low pass luminance signal, the current mode signals developed in conductors 32 and 34 include in-phase low pass luminance components. Also, since the differential mode signal supplied to the amplifier 30 comprises the second derivative signal, the current mode signals developed in conductors 32 and 34 include out-of-phase second derivative components.

The current mode signals developed in conductors 32 and 34 are coupled to a peaking processor circuit 40 which is controlled by a viewer operable peaking control potentiometer 60 and a peaking control circuit 64. As will be explained in further detail hereinafter, the differential mode gain of the peaking processor 40 is controlled in response to the peaking control circuit 64 for converting the second derivative current mode peaking signals developed on conductors 32 and 34 to corresponding amplitude adjusted current mode peaking signals on a pair of output conductors 66 and 68 respectively. Also, the peaking processor 40 is operated in a dynamic mode wherein the differential gain thereof is increased (to a level dependent upon the setting of the user peaking control 60) in response to a transition in the luminance signal and is decreased when no luminance transitions are present. As a result, relatively large amplitude peaking signals are developed to accentuate luminance transitions while the background noise characterizing the video signal during flat field areas of the television picture is deaccentuated. The current mode signals developed on conductors 66 and 68, which represent amplitude scaled second derivative peaking signal components together with low pass luminance components, are coupled to a picture processor 70 which is operable in both a differential and a common mode. The picture processor 70, whose gain is determined by a viewer operable picture control potentiometer 90 and a DC control amplifier 92, converts the entire current mode signals developed on conductors 66 and 68 to corresponding amplitude adjusted current mode signals on a pair of output conductors 94 and 96 respectively for controlling the contrast of the reproduced image. An automatic beam limiter 98 is coupled to the DC control amplifier 92 by a conductor 100 for reducing the gain of the picture processor 70 in response to excessive picture tube beam currents. Finally, a peak white limiter 102, which is connected to a source of supply potential B+, converts the current mode signals developed on conductors 94 and 96 to a corresponding voltage signal on output conductor 24 while reducing the white going second derivative peaking components to about one-half the amplitude of the black going second derivative peaking components. This allows the use of a relatively large peaking signal amplitude without the picture blooming normally associated with excessive white going peaking signals.

It will be observed that the output luminance signal developed on conductor 24 includes a low pass luminance component and a 180° out-of-phase second derivative peaking component. The amplitude of the entire output luminance signal is controllable by the picture processing circuitry for adjusting the resulting picture contrast while the dynamic peaking signal component is independently controllable by the peaking processor circuitry for setting a desired peaking level. In addition, it will further be observed that amplifier 30, the peaking processor 40, the picture processor 70 and the peak white limiter 102 are stacked in a cascode arrangement and operated from a single source of DC supply B+. This provides greatly decreased power consumption and a more efficiently operated circuit and is to be contrasted with the conventional technique of operating each functional circuit from a separate source of DC potential.

Figure 3:
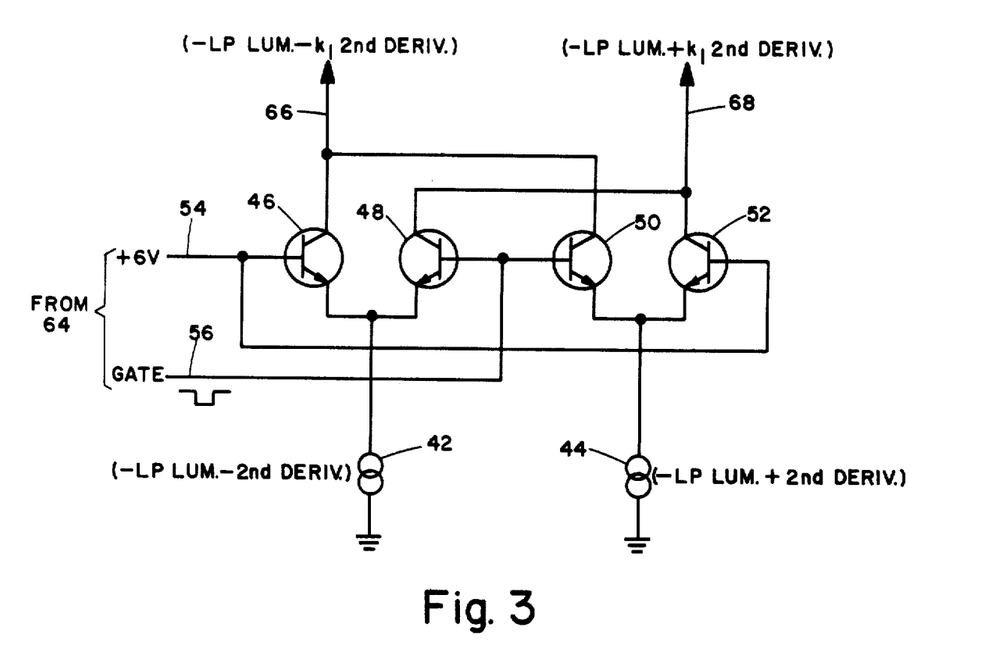
FIG. 3 is a schematic diagram of the peaking processor 40 shown generally in FIG. 1.

The peaking processor 40 is shown in more detail in FIG. 3. For purposes of clarity, the current mode signals developed on conductors 32 and 34 are represented by a pair of current sources 42 and 44 respectively. The current source 42 therefore develops a current corresponding to (−Low Pass Luminance−2nd Derivative) while current source 44 develops a current corresponding to (−Low Pass Luminance+2nd Derivative). The current source 42 is connected to the emitters of a pair of transistors 46 and 48 whose collectors are cross-coupled to the collectors of a second pair of transistors 50 and 52, the emitters of transistors 50 and 52 being connected to current source 44. The base terminals of transistors 46 and 52 are supplied with a positive DC control voltage (e.g. 6 volts) developed on a conductor 54 and the base terminals of transistors 47 and 50 are supplied with a gate signal developed on a conductor 56. The gate signal developed on conductor 56, whose derivation will be explained in detail hereinafter, comprises a viewer adjustable negative going pulse defining each transition of the luminance signal as illustrated in FIG. 4.

Figure 4:
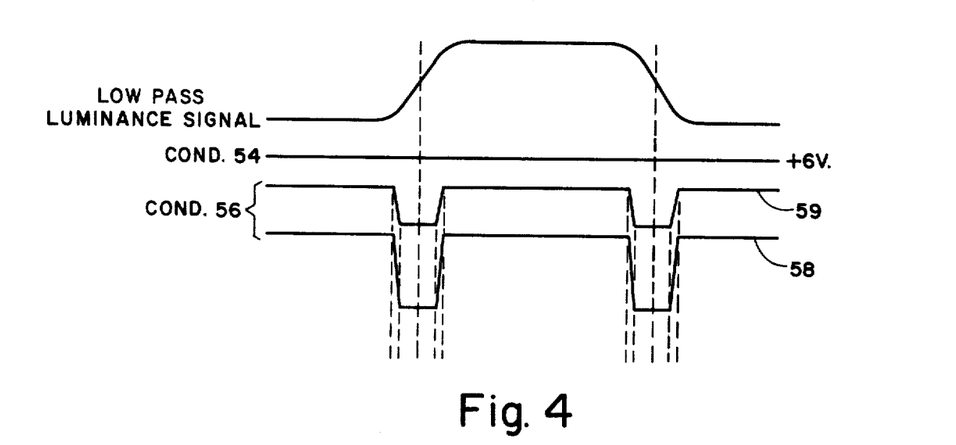
FIG. 4 graphically depicts a series of waveform signals pertinent to the operation of the peaking processor 40 shown in FIG. 3.

In order to facilitate the explanation of the operation of the peaking processor 40 illustrated in FIG. 3, assume initially that the gate signal on conductor 56 corresponds to waveform 58 of FIG. 4 which represents the maximum peaking setting by the viewer. Due to the positive DC control voltage developed on conductor 54 and the less positive voltage developed on conductor 56, transistors 46 and 52 will be in a continuously conducting state. The transistors 48 and 50, on the other hand, will be non-conductive during the negative pulse portions of the gate signal developed on conductor 56 and will otherwise be conductive, the degree of conduction being determined by the difference between the voltage levels on the conductors 54 and 56. Therefore, during a luminance transition, the negative going pulse of the gate signal represented by waveform 58 cuts off transistors 48 and 50 while transistors 46 and 52 are fully conductive. As a consequence, the current signal developed by current source 44 is coupled in a substantially unmodified form through transistor 52 to output conductor 68. Similarly, the current signal developed by current source 42 is coupled in a substantially unmodified form through transistor 46 to output conductor 66. It will be noted that the second derivative peaking signals developed as current mode signals on conductors 66 and 68 have a maximum magnitude corresponding to the magnitudes of the peaking components of current sources 42 and 44 whereby maximum peaking is realized during luminance transitions.

During the positive going portions of the gate signal represented by waveform 58, corresponding to the flat field portions of the luminance signal, the transistors 48 and 50 are conductive but to a lesser degree than transistors 46 and 52. The currents developed by current sources 42 and 44 are consequently split among their associated transistors whereby the magnitudes of the second derivative peaking components developed on conductors 66 and 68 are significantly reduced. In particular, consider the exemplary condition wherein the current developed by current source 44 is split between transistors 52 and 50 such that transistor 52 conducts $\frac{3}{4}$ of the available current while transistor 50 conducts the remaining $\frac{1}{4}$. Also, assume that transistors 46 and 48 similarly divide the current developed by current source 42. Under these assumptions, the current developed at the collector of transistor 52 (31 $\frac{3}{4}$ Low Pass Lum. $+\frac{3}{4}$ Second Der.) is combined with the current developed at the collector of transistor 48 ($-\frac{1}{4}$ Low Pass Lum. $-\frac{1}{4}$ Second Der.) to form a current mode signal on conductor 68 represented by the expression ($-$Low Pass Lum. $+\frac{1}{2}$ Second Der.). In a similar manner, a current mode signal is developed on conductor 66 represented by the expression ($-$Low Pass Lum. $-\frac{1}{2}$ Second Der.). It will thus be observed that the second derivative peaking components have been significantly reduced in magnitude while the low pass luminance components remain unmodified. The peaking processor 40 is therefore operative in a differential mode for controlling the differential second derivative peaking signals coupled thereto but has no effect on the common mode low pass luminance signals developed by current sources 42 and 44.

The differential mode gain of the peaking processor 40 is controlled by the gating signal developed on conductor 56 to set the levels of the peaking signals during the transitions and flat field portions of the luminance signal. As mentioned previously, the gating signal represented by waveform 58 of FIG. 4 results in a maximum differential mode gain wherein the magnitude of the second derivative peaking signals are maximized during luminance transitions. The gating signal may be adjusted by the viewer in a manner to be described hereinafter to selectively reduce the magnitudes of the peaking signals to a desired level. Thus, for example, the gating signal waveform 59 of FIG. 4 will reduce the differential mode gain of the peaking processor 40 from its maximum level by increasing the voltage signals coupled to the base terminals of transistors 48 and 50 so that the latter transistors draw an increased share of current from the current sources 42 and 44. This has the effect of decreasing the differential mode second derivative peaking signals developed on conductors 66 and 68 during both flat field and transition portions of the luminance signal. Through operation of potentiometer 60, the gating signal may therefore be adjusted to any value between the maximum value represented by waveform 58 and the DC control level developed on conductor 54 enabling the viewer to set the amount of peaking to satisfy his individual preferences. It will be observed that when the gating signal is adjusted to its minimum value coinciding with the DC control voltage on conductor 54, all four transistors 46, 48, 50 and 52 are conducting equally. As a result, the differential mode gain of the peaking processor is essentially zero and no second derivative peaking signals are developed on conductors 66 and 68. With reference to FIG. 3, the variable $K_1$ is used to denote the differential mode gain of the peaking processor 40, it being realized that this variable is non-linear in nature in that, for any given setting of control potentiometer 60, the gain is different during luminance transitions and during flat field portions of the luminance signal.

Figure 2A:
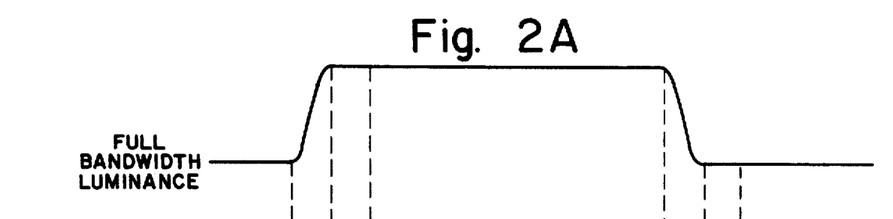
FIGS. 2A–2F graphically illustrate a sequence of wave-form signals developed by the circuit of FIG. 1 in response to an input full bandwidth luminance signal.
Figure 2B:
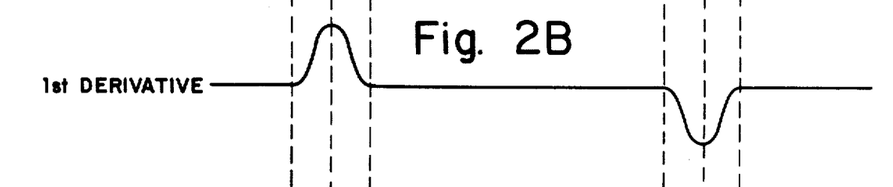
Figure 2C:
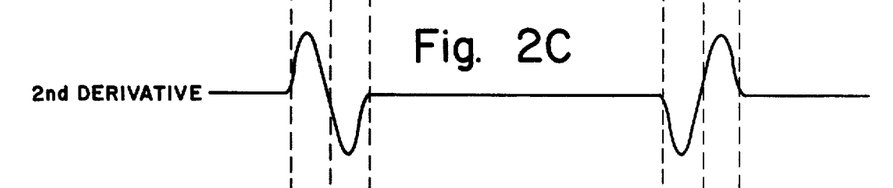
Figure 2D:
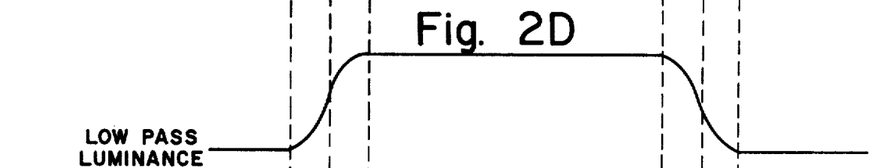
Figure 2E:
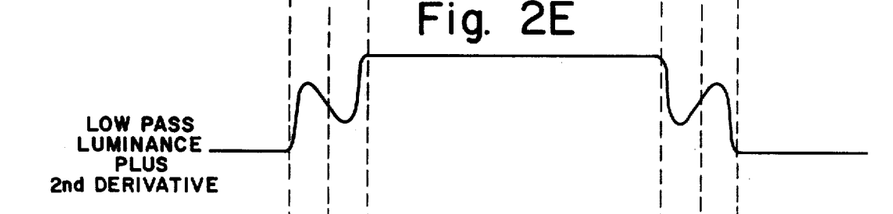
Figure 5:
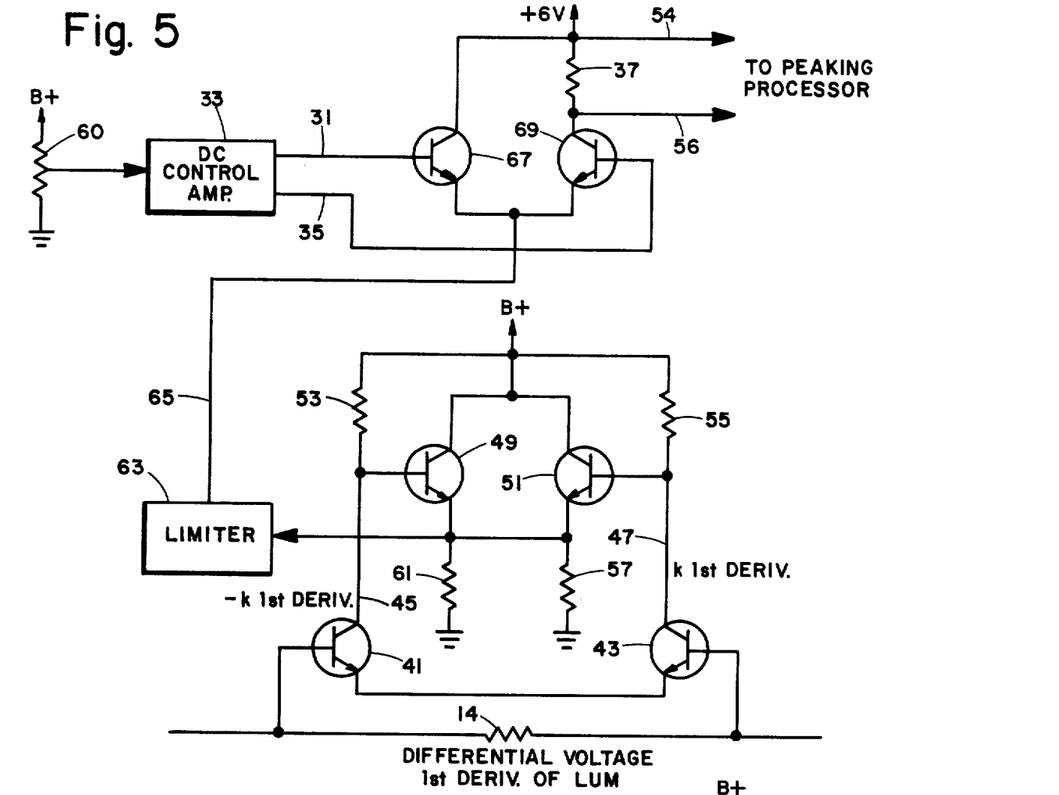
FIG. 5 is a schematic diagram of the peaking control circuit 64 of FIG. 1.

FIG. 5 illustrates in detail the peaking control circuit 64 which generates the DC control signal on conductor 54 and the gating signal on conductor 56 in response to the peaking control potentiometer 60. With reference to the Figure, the differential voltage developed across resistor 14 is coupled through a differential amplifier comprising a pair of transistors 41 and 43 and developed as a pair of 180° out-of-phase first derivative current mode signals on a pair of output conductors 45 and 47. Referring back to FIG. 2, it will be recalled that the first derivative of the luminance signal comprises a positive going pulse developed in response to each transition of the luminance signal from black to white and a negative going pulse defining each luminance signal transition from white to black. Since these first derivative signals therefore define luminance transitions, they are ideally suited for controlling, together with the setting of potentiometer 60, the development of the gating signals on conductor 56. More specifically, the 180° out-of-phase first derivative signals are coupled from conductors 45 and 47 to the base terminals of a pair of transistors 49 and 51 whose collectors are connected to a source of DC potential and which, together with resistors 53 and 55 form a full-wave rectifier circuit. During one polarity or phase of the first derivative signal one of the transistors 49 and 51 is conductive while the other is off. As a result, the conductive transistor develops a current in a common emitter resistor 57 which couples a positive voltage pulse through a resistor 61 to the input of an amplitude limiter 63. During the alternate phase or polarity of the first derivative signal the other transistor is conductive and develops a current in emitter resistor 57 which is also converted to a positive voltage pulse at the input of limiter 63. Limiter 63 therefore develops an output signal on a conductor 65 comprising a negative going amplitude limited pulse in time coincidence with each transition, whether white to black or black to white, of the luminance signal.

The rectified and amplitude limited first derivative pulses developed on conductor 65 are coupled to the emitter terminals of a pair of transistors 67 and 69 forming another differential amplifier. The base terminal of transistor 67 is supplied from a first output conductor 31 of a DC control amplifier 33 operated in response to peaking control potentiometer 60 while the base terminal of transistor 69 is supplied from a second output conductor 35 of the DC control amplifier 33. The collector of transistor 67 is connected to a +6 V supply of control voltage and the collector of transistor 69 is connected to the +6 volt control voltage through a resistor 37.

The DC control amplifier 33 is operative for developing a maximum positive voltage on output conductor 31 and a minimum positive voltage on output conductor 35 in response to setting the control potentiometer 60 for minimum peaking gain. When the control potentiometer 60 is set for maximum peaking gain, similar voltage signals are developed on output conductors 31 and 35 but of the opposite polarity. Voltage levels ranging between these limits are developed on conductors 31 and 35 in response to intermediate peaking gain settings of potentiometer 60. Considering first the case of minimum peaking gain, it will be observed that transistor 67 will be fully saturated while transistor 69 will be cut-off in response to the voltage signals developed on output conductors 31 and 35. Therefore, no current will flow through transistor 69 such that both sides of the resistor 37, which are connected to conductors 54 and 56 supplying the peaking processor 40, will be at a potential of +6 volts. From the previous discussion it will be recalled that this condition results in the peaking processor 40 being characterized by a minimum differential gain so that no second derivative peaking signals are developed thereby. Next, consider the case of maximum peaking gain wherein transistor 69 is fully saturated and transistor 67 is cut-off. In this case, a maximum current pulse is developed in resistor 37 in time coincidence with each first derivative pulse developed on conductor 65 and a smaller current signal is otherwise developed in the resistor. The voltage developed on conductor 56 therefore forms a gating signal corresponding to waveform 58 of FIG. 4 for realizing maximum differential mode gain of the peaking processor 40 and thereby maximum second derivative peaking signal components. It will be appreciated that for settings of control potentiometer 60 intermediate its maximum and minimum positions, the current signals developed in resistor 37 will vary between zero and the maximum levels described above. As a consequence, gating signals such as waveform 59 of FIG. 4 intermediate the maximum differential gain gating signal represented by waveform 58 and a +6 volt minimum differential gain waveform will be developed on conductor 56 for controlling the peaking processor 40 as previously described.

As described previously, the dynamically adjusted second derivative peaking signals together with the low pass luminance signals are coupled from the peaking processor 40 over conductors 66 and 68 to a picture processor 70 for controlling the contrast of the reproduced image. The picture processor 70 is shown in detail in FIG. 6 wherein a pair of current sources 72 and 74 have again been used to represent the current mode signals developed on conductors 66 and 68 for application to the picture processor 70. Current source 72 therefor develops a current represented by the expression ($-$Low Pass Lum. $-k_1$ Second Der.) while current source 74 develops a current represented by the expression ($-$Low Pass Lum.$+k_1$ Second Der.). Current source 72 is connected to the emitters of a pair of transistors 76 and 78, the collector of transistor 76 being connected through a pair of resistors 80 and 82 to DC potential B+ and the collector of transistor 78 being connected only through resistor 82 to DC potential B+. Current source 74 is similarly connected to the emitters of a second pair of transistors 84 and 86, the collector of transistor 86 being connected through a pair of resistors 71 and 73 and a diode 75 to DC potential B+ and the collector of transistor 84 being connected through resistor 73 and diode 75 to DC potential B+. The base terminals of transistors 78 and 84 are supplied in common from a first output conductor 77 of a DC control amplifier 70 while the base terminals of transistors 76 and 86 are supplied in common from a second output conductor 81 of the DC control amplifier 79, the DC control amplifier being operated in response to inputs from the picture control potentiometer 90 and the automatic beam limiter 98. Finally, a series connected resistor 104 and diode 106 forming peak white limiter 102 are coupled between the collectors of transistors 76 and 86. The fully processed luminance output signal is developed as a voltage on output conductor 24 as will be described hereinafter, output conductor 24 being connected to the collector of transistor 86.

Figure 6:
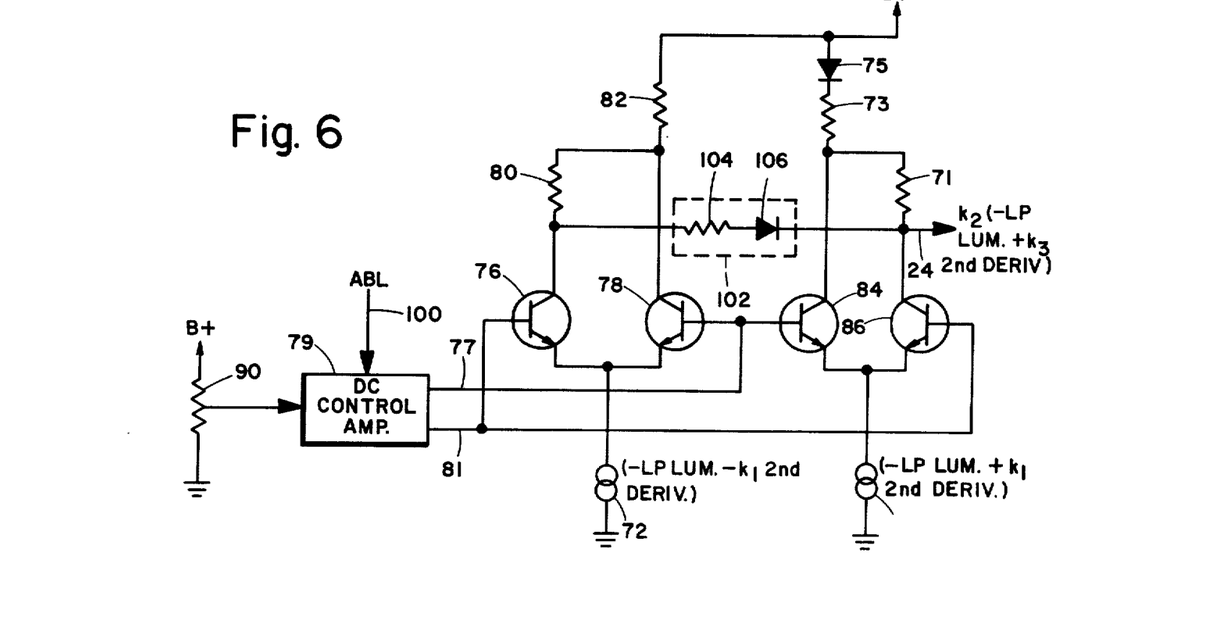
FIG. 6 is a schematic diagram of the picture processor 70 and peak white limiter 102 of FIG. 1.

The common mode gain of the picture processor 70 is controlled by the DC control amplifier 79 which, in turn, is controlled by the viewer operable picture control potentiometer 90. For the minimum common mode gain setting of picture control potentiometer 90, the DC control amplifier 79 is operative for developing a maximum positive DC potential on conductor 77 and a minimum positive DC potential on conductor 81. Transistors 78 and 84 are therefore turned fully on while transistors 76 and 86 are cut off. The current mode signal established by current source 72 is consequently coupled by transistor 78 only through resistor 82 while the current mode signal established by current source 74 is coupled by transistor 84 only through resistor 73 and diode 75. Since both transistors 76 and 86 are cut off, no current flow is established through resistors 71 and 80. The output voltage established on conductor 24 is directly related to the output impedance of the picture processor 70 which, for the minimum gain setting of potentiometer 90, consists only of the resistance characterizing resistor 73. Since the resistance of resistor 73 is relatively small, e.g. on the order of 340 ohms, a correspondingly small voltage is developed on output conductor 24 representing the processed luminance signal.

For the maximum common mode gain setting of picture control potentiometer 90, the DC control amplifier 79 is operative for developing similar DC potentials on conductors 77 and 81 but having the opposite polarity, i.e., a minimum positive DC potential is developed on conductor 77 and a maximum positive DC potential is developed on conductor 8. In this case, transistors 76 and 86 are turned fully on while transistors 78 and 84 are cut off. The current mode signal established by current source 72 is now coupled by transistor 76 through both resistors 80 and 82 while the current mode signal established by current source 74 is coupled by transistor 86 through both resistors 71 and 73. As a consequence, the output impedance of the picture processor 70 seen at conductor 24 comprises the series combination of the resistances of resistors 71 and 73 and, since the resistance of resistor 71 is significantly larger (e.g. 2K) than that of resistor 73, the output impedance and common mode gain of the picture processor 70 is correspondingly increased whereby the processed luminance signal amplitude on conductor 24 is maximized.

For settings of the picture control potentiometer 90 between its maximum and minimum gain positions, the DC control amplifier 79 develops DC potentials on conductors 77 and 81 intermediate the foregoing maximum and minimum vales. These intermediate DC potentials cause the transistors 76, 78, 84 and 86 to conduct in various proportions whereby the collector load impedance of the picture processor output circuit sensed at conductor 24 may be varied between its maximum and minimum values. The common mode gain of the picture processor 70 and thus the voltage developed on output conductor 24 representing the processed luminance signal may thereby be varied between its maximum and minimum values according to the setting of picture control potentiometer 90. The variable $k_2$ is used in the drawings to denote the variable common and differential mode gains of the picture processor 70.

Figure 2F:
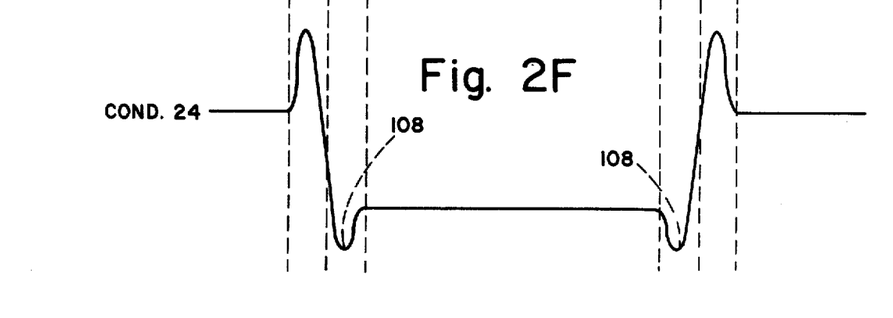

The peak white limiter 102 consisting of resistor 104 and diode 106 effects only the differential mode signal of the current sources 72 and 74. More specifically, the white going phases of the second derivative peaking components of the current sources 72 and 74 cause the diode 106 of peak white limiter 102 to conduct while the black going phases leave the diode non-conductive. Therefore, in response to a second derivative white going peaking signal, the resistor 104 is effectively connected in parallel with the series combination of resistors 71, 73, 80 and 82. The differential collector lead impedance of the output circuit of the picture processor 70 is thereby decreased such that the level of the white going second derivative peaking signal is similarly decreased. Since the diode 106 does not conduct in response to the black going second derivative peaking signals, the output impedance of the picture processor 70 is unaltered so that black going peaking components are unaffected. As an example, the resistor 104 may be selected such that its resistance is equal to twice the series resistance of resistors 71 and 73 whereby the differential gain of white going peaking components is reduced by 6 db relative to black going peaking components. This effect, which is illustrated by the dotted lines 108 shown in the waveform of FIG. 2F allows an increase in peaking amplitude without an increase in blooming associated with excessive peak white signals. The automatic beam limiter 98 couples a control signal over conductor 100 to the DC control amplifier 79 in the presence of high duty cycle video signals. In response thereto, the control amplifier 79 automatically adjusts the DC potential of the signals developed on conductors 77 and 81 for reducing the common and differential mode gains of the picture processor 70.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. In a television receiver of the type having means developing a full bandwidth luminance signal including a low pass component and first and second derivative components of said low pass component, an improved luminance signal processing circuit comprising:

means responsive to said luminance signal for developing a first control voltage representing said low pass component and a second control voltage representing the combination of said low pass and second derivative components;

amplifier means responsive to said first and second control voltages for developing first and second current mode signals representing, respectively, in phase and 180° out of phase combinations of said low pass and second derivative components;

peaking signal processor means selectively operable for controlling the levels of only the second derivative components of said first and second current mode signals for developing corresponding third and fourth current mode signals respectively;

picture processor means selectively operable for simultaneously controlling the levels of both the second derivative and low pass components of at least one of said third and fourth current mode signals for developing a corresponding output luminance voltage signal; and a single source of DC potential coupled only to said picture processor means for supplying the bias energy from which said first, second, third and fourth current mode signals are derived.

2. The luminance signal processing circuit of claim 1 wherein said means for developing said first and second control voltage comprises a series connected RLC circuit.

3. The luminance signal processing circuit of claim 1 wherein said amplifier means comprises differential amplifier means operable for amplifying both input common mode and differential mode signals.

4. The luminance signal processing circuit of claim 1 including means for developing a third control voltage representing said first derivative component of said luminance signal and wherein said peaking signal processor means is responsive to said third control voltage for selectively increasing the level of said second derivative components of said first and second current mode signals occurring during luminance signal transitions relative to the level of said second derivative components occurring during flat field portions of the luminance signal.

5. The luminance signal processing circuit of claim 1 wherein said picture processor means includes peak white limiter means responsive only to the second derivative components of said third and fourth current mode signals for causing said output luminance voltage to reflect a reduction in the level of the white going portions of said second derivative components relative to the black going portions thereof.

6. In a television receiver of the type having means developing a full bandwidth luminance signal including a low pass component and first and second derivative components of said low pass component, an improved luminance signal processing circuit comprising:

means for developing first and second current mode signals representing, respectively, in phase and 180° out of phase combinations of said low pass and second derivative components;

means developing a gating signal defining each white and black going transition of said luminance signal;

peaking processor means combining said first and second current mode signals for developing third and fourth current mode signals having low pass components corresponding to the low pass components of said first and second current mode signals and a second derivative components which are non-linearly related to the second derivative components of said first and second current mode signals, said non-linear relationship being defined by said gating signal; and picture processor means selectively operable for controlling the level of said third and fourth current mode signals for developing a corresponding output luminance voltage signal.

7. The luminance signal processing circuit of claim 6 wherein said means for developing a gating signal comprises viewer operable means for adjustably setting the levels of said gating signal at different amplitudes during said luminance signal transitions and during flat field portions of said luminance signal and wherein said peaking processor means comprises means for controlling the levels of said second derivative components in accordance with the amplitude of said gating signal.

8. The luminance signal processing circuit of claim 6 including a single supply of DC potential coupled to said picture processor means for supplying the bias energy from which said first, second, third and fourth current mode signals are derived.

9. The luminance signal processing circuit of claim 6 wherein said picture processor means includes peak white limiter means responsive only to the second derivative components of said third and fourth current mode signals for causing said output luminance voltage to reflect a reduction in the level of the white going portions of said second derivative components relative to the black going portions thereof.

10. The luminance signal processing circuit of claim 7 wherein said means for developing a gating signal comprises means for developing a differential voltage signal representing said first derivative component, means responsive to said differential voltage signal for developing a full-wave rectified control voltage signal consisting of a succession of pulses defining said luminance signal transitions, and viewer operable means for adjusting the levels of said pulsating control voltage signal for developing said gating signal.

11. The luminance signal processing circuit of claim 9 wherein said picture processor means comprises viewer operable means for controlling the level of said third and fourth current mode signals.

12. The luminance signal processing circuit of claim 11 wherein said peak white limiter means comprises means for automatically changing the impedance of said picture processor means in response to white going portions of said second derivative components of said third and fourth current mode signals for causing a corresponding reduction in the level of said output luminance voltage.

13. In a television receiver of the type having means developing a full bandwidth luminance signal including a low pass component, a second derivative component and a first derivative component, an improved luminance signal processing circuit comprising:

means for developing first and second current mode signals representing, respectively, in phase and 180° out of phase combinations of said low pass and second derivative components;

peaking signal processor means selectively operable for controlling the levels of only the second derivative components of said first and second current mode signals for developing corresponding third and fourth current mode signals;

picture processor means having a variable load impedance controllable for selectively setting the levels of said third and fourth current mode signals for developing a corresponding output luminance voltage signal; and peak white limiter means connected for automatically changing said variable load impedance in response to white going portions of said second derivative components of said third and fourth current mode signals for causing a corresponding reduction in the level of said output luminance voltage signal.

14. The luminance signal processing circuit of claim 13 including a single supply of DC potential coupled to said picture processor means for supplying the bias energy from which said first, second, third and fourth current mode signals are derived.

15. The luminance signal processing circuit of claim 14 wherein said peaking signal processor means comprises viewer operable means for developing a bi-level gating signal consisting of a succession of variable amplitude pulses defining each white and black going transition of said luminance signal and means for controlling the levels of said second derivative components of said first and second current mode signals according to the instantaneous amplitude of said gating signal.

* * * * *